(12) United States Patent
Liao et al.

(10) Patent No.: US 9,601,801 B2
(45) Date of Patent: Mar. 21, 2017

(54) ELECTROLYTES COMPRISING METAL AMIDE AND METAL CHLORIDES FOR MULTIVALENT BATTERY

(71) Applicant: UChicago Argonne, LLC, Chicago, IL (US)

(72) Inventors: Chen Liao, Willowbrook, IL (US); Zhengcheng Zhang, Naperville, IL (US); Anthony Burrell, Naperville, IL (US); John T. Vaughey, Elmhurst, IL (US)

(73) Assignee: UCHICAGO ARGONNE, LLC, Chicago, IL (US)

( * ) Notice: Subject to any disclaimer, the term of this patent is extended or adjusted under 35 U.S.C. 154(b) by 179 days.

(21) Appl. No.: 14/335,604

(22) Filed: Jul. 18, 2014

(65) Prior Publication Data
US 2016/0020485 A1    Jan. 21, 2016

(51) Int. Cl.
| H01M 10/0568 | (2010.01) |
|---|---|
| H01M 10/054 | (2010.01) |
| H01M 4/58 | (2010.01) |
| H01M 4/485 | (2010.01) |

(52) U.S. Cl.
CPC ....... *H01M 10/054* (2013.01); *H01M 4/5815* (2013.01); *H01M 10/0568* (2013.01); *H01M 4/485* (2013.01); *H01M 4/5825* (2013.01); *H01M 2300/0025* (2013.01)

(58) Field of Classification Search
CPC ............. H01M 10/054; H01M 10/056; H01M 10/0566; H01M 10/0567; H01M 2300/0025
See application file for complete search history.

(56) References Cited

U.S. PATENT DOCUMENTS

| 6,828,269 B2 * | 12/2004 | Commereuc et al. ........ 502/117 |
| 2012/0107698 A1 * | 5/2012 | Muldoon ............ H01M 10/054 429/337 |
| 2013/0252112 A1 | 9/2013 | Doe et al. |

FOREIGN PATENT DOCUMENTS

WO    WO-2013/096827    6/2013

OTHER PUBLICATIONS

Yoo, H.D., Shterenberg, I., Gofer, Y., Gershinsky, G., Pour, N., Surbach, D-"Mg rechargeable batteries: an on-going challenge", Energy & Environmental Science, 2013, 6, pp. 2265-2279, published on May 10, 2013.*
Aurbach, D., et al., "Prototype systems for rechargeable magnesium batteries," Nature 2000, vol. 407, Issue 6805, pp. 724-727.
Gregory, T.D., et al., "Nonaqueous Electrochemistry of Magnesium: Applications to Energy Storage," J. of Electrochemical Society, 1990, vol. 137, Issue 3, pp. 775-780.
Guo, Y.S., et al., "Boron-based electrolyte solutions with wide electrochemical windows for rechargeable magnesium batteries," Energy & Environmental Science, 2012, vol. 5, Issue 10, pp. 9100-9106.
Lancry, E., et al., "Molten salt synthesis (MSS) of Cu2Mo6S8—New way for large-scale production of Chevrel phases," J. of Solid State Chemistry, 2006, vol. 179, Issue 6, pp. 1879-1882.
Lossius, L.P., et al., "Plating of magnesium from organic solvents," Electrochimica Acta, 1996, vol. 41, Issue 3, pp. 445-447.
Lu, Z., et al., "On the electrochemical behavior of magnesium electrodes in polar aprotic electrolyte solutions," J. of Electroanalytical Chemistry, 1999, vol. 466, pp. 203-217.
Mizrahi, O., et al., "Electrolyte Solutions with a Wide Electrochemical Window for Rechargeable Magnesium Batteries," J. of Electrochemical Society, 2008, vol. 155, Issue 2, pp. A103-A109.
Muldoon, J., et al., "Corrosion of magnesium electrolytes: chlorides—the culprit", Energy & Environmental Science, 2013, vol. 6, Issue 2, pp. 482-487.
Yoo, H.D., et al., "Mg rechargeable batteries: an on-going challenge," Energy & Environmental Science, 2013, vol. 6, Issue 8, pp. 2265-2279.

* cited by examiner

*Primary Examiner* — Anca Eoff
(74) *Attorney, Agent, or Firm* — Foley & Lardner LLP

(57) ABSTRACT

An electrolyte includes compounds of formula $M^1X_n$ and $M^2Z_m$; and a solvent wherein $M^1$ is Mg, Ca, Sr, Ba, Sc, Ti, Al, or Zn; $M^2$ is Mg, Ca, Sr, Ba, Sc, Ti, Al, or Zn; X is a group forming a covalent bond with $M^1$; Z is a halogen or pseudo-halogen; n is 1, 2, 3, 4, 5, or 6; and m is 1, 2, 3, 4, 5, or 6.

14 Claims, 18 Drawing Sheets

ELECTROLYTES COMPRISING METAL AMIDE AND METAL CHLORIDES FOR MULTIVALENT BATTERY

GOVERNMENT RIGHTS

The United States Government has rights in this invention pursuant to Contract No. DE-AC02-06CH11357 between the U.S. Department of Energy and UChicago Argonne, LLC, representing Argonne National Laboratory.

FIELD

The present technology is generally related to electrolyte compositions for magnesium and other multivalent batteries, and, more particularly, to such compositions having a metal salt or complex included therein.

BACKGROUND

Rechargeable batteries are essential components for consumer electronics, electric vehicle, and large grid energy storage. The state-of-the-art lithium ion batteries have high energy density and power density; however, their limitations lie in the high cost, low natural abundance of lithium, and safety issues related to dendrite formation. Efforts continue in the search for alternative electrode and electrolyte materials that are environmentally benign and of lower cost.

Multivalent batteries are batteries in which more than one electron is involved in the electrochemical conversion reaction. One example of a multivalent battery is a magnesium ion battery. Magnesium is one of the most abundant elements on earth, and is an attractive electrode material with a high theoretical specific capacity of 2205 Ah/kg and a high theoretical energy density of 3800 mAh/g. Because of its two valence charges, Mg has a specific volumetric capacity of 3833 mAh/cc, higher than that of lithium metal (2046 mAg/cc). Thus, upon oxidation, magnesium can provide one electron to advance to the $Mg^+$, which, in turn, may then provide a second electron to form $Mg^{2+}$.

Although rechargeable, multivalent batteries have been studied for more than a decade, they are still facing several obstacles. For example, in terms of magnesium batteries, reaction between magnesium and standard electrolytes results in passivation of the magnesium surface. Unlike lithium ions, which can move through a solid electrolyte interface containing inorganic lithium salts (e.g., lithium carbonate and lithium fluoride), magnesium ions cannot pass such passivated films. Additionally, there is a need for safer and more efficient magnesium electrolytes. Other multivalent batteries, such as calcium ion batteries and aluminum ion batteries, face similar problems.

Magnesium batteries have a magnesium anode, a cathode, and an electrolyte to carry electrons from the magnesium to the cathode. Good ionic conductivity is required at the interface of the anode/electrolyte and the cathode/electrolyte. The anode/electrolyte interface requires a fresh surface that does not block the ionic conductivity. Grignard reagents (R—Mg—X, where R is an organic residue and X is halogen) are one type of electrolyte for magnesium batteries that provides for a good anode/electrolyte interface. For magnesium batteries, ether solutions of magnesium-based Grignard reagents allow reversible magnesium deposition and dissolution with a high coulombic efficiency. However, they have fairly low anodic stability, and exhibit an electrochemical window of less than 1.8 V. See Lossius, L. P. et al. *Electrochimica Acta*, 41(3): 445-447 (1996).

Typical Grignard reagents include those denoted by the formula RMgCl (where R=methyl, ethyl, butyl). By introducing a Lewis acid to the Grignard reagent results in a Grignard-Lewis acid, the electrochemical window of the resulting magnesium-Al electrolyte can be substantially increased, compared to ethyl Grignard (Et—Mg—Cl). See e.g. Aurbach, D. et al. *Nature*, 407(6805):724-727 (2000); Mizrahi, O. et al. *J. Electrochem. Soc.* 155(2):A103-A109 (2008); Guo, Y. S. et al. *Energy & Environmental Science* 5(10):9100-9106 (2012); Muldoon, J. et al. *Energy & Environmental Science* 6(2):482-487 (2012).

The current state-of-the-art intercalation electrode for magnesium ion batteries is $Mo_6S_8$, which is conventionally used in a THF (tetrahydrofuran) solution of a Grignard reagent, $Mg(AlCl_2EtBu)_2$, to construct a rechargeable magnesium ion battery. The $Mg(AlCl_2EtBu)_2$ electrolyte has an improved electrochemical stability up to 2.4 V vs $Mg/Mg^{2+}$. However, despite the 100% efficiency of deposition/dissolution toward the magnesium electrode, the $Mg(AlCl_2EtBu)_2$ electrolyte is highly flammable and has a relatively low solubility in THF solution. The large molecular weight of $Mg(AlCl_2EtBu)_2$ also makes it less attractive as an electrolyte. Recent patents reported by Pellion Technologies Inc. include the $Mg_aZ_bX_c$ complexes (WO 2013/096827 A1), while Z and X form Lewis acid. For example, a THF solution of $2MgCl_2/AlCl_3$, shows reversible magnesium deposition/dissolution with a electrochemical window of 3.0 V.

Another electrolyte with high oxidative stability is a THF solution of magnesium bis(trifluoromethylsulfonylimide) and magnesium chloride $(Mg(TFSI)_2/MgCl_2)$. Such an electrolyte avoids the use of Grignard reagents. See U.S. Pat. Publ. 2013/0025211. However, the $MgCl_2/AlCl_3$ mixture utilizes strong Lewis Acid of $AlCl_3$ which showed reactivity toward cyclic ether solvent (tetrahydrofuran), while the $Mg(TFSI)_2/MgCl_2$ can potentially have decomposition from the TFSI anion on the surface of magnesium anode.

SUMMARY

In one aspect, an electrolyte is provided including compounds of formula $M^1X_n$ and $M^2Z_m$, and a solvent. In the electrolyte, $M^1$ is Mg, Ca, Sr, Ba, Sc, Ti, Al, or Zn; $M^2$ is Mg, Ca, Sr, Ba, Sc, Ti, Al, or Zn; X is a group covalently bonded to $M^1$; Z is a halogen or pseudo-halogen; n is 1, 2, 3, 4, 5, or 6; and m is 1, 2, 3, 4, 5, or 6. In some embodiments, $M^1$ is Mg. In any of the above embodiments, $M^2$ is Mg. In any of the above embodiments, Z is F, Cl, Br, I, CN, or SCN. In any of the above embodiments, X is an amide, alkoxide, or phenoxide.

In another aspect, a rechargeable battery is provided including a cathode; an anode; and an electrolyte comprising. In the rechargeable battery, the electrolyte includes compounds of formula $M^1X_n$ and $M^2Z_m$, and a solvent. In the electrolyte, $M^1$ is Mg, Ca, Sr, Ba, Sc, Ti, Al, or Zn; $M^2$ is Mg, Ca, Sr, Ba, Sc, Ti, Al, or Zn; X is a group covalently bonded to $M^1$; Z is a halogen or pseudo-halogen; n is 1, 2, 3, 4, 5, or 6; and m is 1, 2, 3, 4, 5, or 6. In some embodiments, $M^1$ is Mg. In any of the above embodiments, $M^2$ is Mg. In any of the above embodiments, Z is F, Cl, Br, I, CN, or SCN. In any of the above embodiments, X is an amide, alkoxide, or phenoxide. The rechargeable batteries may be void of $AlCl_3$.

In another aspect, an electrolyte is provided including $Mg_p(hexamethyldisilazane)_nCl_q$ or $Mg(2,6$-di-tert-butylphenoxide$)_2$. In the $Mg_p(hexamethyldisilazane)_nCl_q$, p is from 2 to 10, n is from 1 to 10, and q is from 2 to 10. However, in some embodiments, p is 3, 5, 7, or 9; n is 2, 4, 6, or 8, and q is 2, 4, 6, or 8. A rechargeable battery is also provided including any of the above electrolytes with a cathode, and an electrode.

BRIEF DESCRIPTION OF THE DRAWINGS

FIG. 5a is 1.25 M Mg(HMDS)$_{2/5}$Cl$_{8/5}$; FIG. 5b is 0.75 M Mg(HMDS)$_{2/5}$Cl$_{8/5}$; FIG. 5c is 0.5 M Mg(HMDS)$_{2/5}$Cl$_{8/5}$; and FIG. 5d is 0.25 M Mg(HMDS)$_{2/5}$Cl$_{8/5}$; according to the examples.

DETAILED DESCRIPTION

Figure 1:
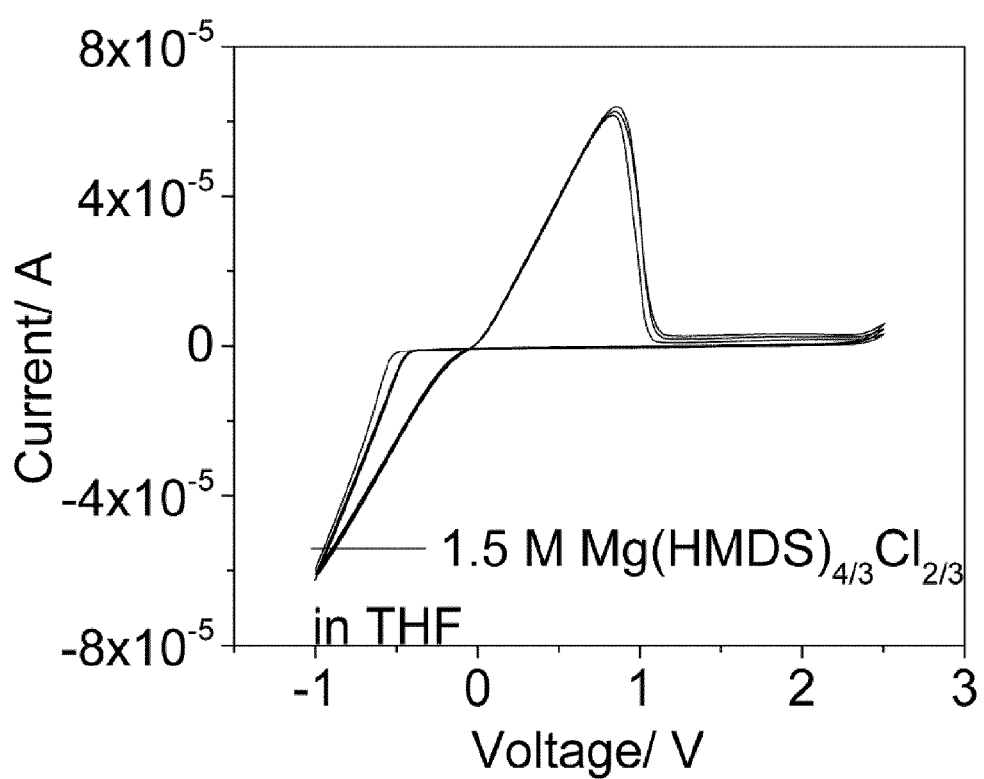
FIG. 1 is cyclic voltammetry (CV) graph of a 1.5 M THF solution Mg(HMDS)$_{4/3}$Cl$_{2/3}$ salts at a Pt working electrode, at a scan rate of 100 mV s$^{-1}$ using Mg as reference and counter electrode, according to the examples.

Various embodiments are described hereinafter. It should be noted that the specific embodiments are not intended as an exhaustive description or as a limitation to the broader aspects discussed herein. One aspect described in conjunction with a particular embodiment is not necessarily limited to that embodiment and can be practiced with any other embodiment(s).

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

The use of the terms "a" and "an" and "the" and similar referents in the context of describing the elements (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the embodiments and does not pose a limitation on the scope of the claims unless otherwise stated. No language in the specification should be construed as indicating any non-claimed element as essential.

As used herein, the term "pseudo-halogen" are anions that act in a halogen-like manner. Pseudo-halogens may include, but are not limited to, CN$^-$, SCN$^-$, and SeCN$^-$.

The present inventors have found magnesium ion battery electrolytes that avoid the use of a Grignard Reagent with AlCl$_3$, by providing a covalently bound complex of formula M$^1$X$_n$ with a metal salt of formula M$^2$Z$_m$. In such complexes, X is not an ionic species with M$^1$, rather X is covalently bonded to M$^1$.

With the elimination of the AlCl$_3$, which is very corrosive, the electrolytes avoid the problem of co-deposition of aluminum metal on the surface of the anode, along with a multivalent metal. By using a covalently bound metal amide and a metal chloride system, the electrolyte exhibits favorable properties such as high ionic conductivity, high Coulombic efficiency, and an electrochemical window approaching 2.5 V. Where the metal, M$^1$, is magnesium, the electrolyte shows reversible Mg deposition and dissolution without the use of Grignard reagents, organometallic materials, Lewis acids or related anions. In addition to magnesium, the strategy can be applied to other multivalent metals, such as, but not limited to, calcium, strontium, barium, zinc, scandium, and yttrium. Additionally, regarding the elimination of the AlCl$_3$, it is to be noted that in any of the embodiments described herein, the electrolyte, battery, and other electrochemical cell components, they may all be void of $AlCl_3$.

As noted, the electrolyte may include a covalently bonded compound of formula $M^1X_n$ and a compound of formula $M^2Z_m$, where $M^1$ is Mg, Ca, Sr, Ba, Sc, Ti, Al, or Zn; $M^2$ is Mg, Ca, Sr, Ba, Sc, Ti, Al, or Zn; X is a halogen or pseudo-halogen; Z is an amide, an alkoxide, or a phenoxide; n is 1, 2, 3, 4, 5, or 6; and m is 1, 2, 3, 4, 5, or 6. In any of the above embodiments, $M^1$ may be Mg. In any of the above embodiments, $M^2$ may be Mg. In any of the above embodiments, n may be 1, 2, or 3. In any of the above embodiments, m may be 1 or 2. The electrolytes are based upon the observation by the inventors that $MgCl_2$ complexes with $M^2Z_m$ to increase the amount of $MgCl_2$ in the electrolyte. The process is referred to as a Reverse Schlenk Equilibrium (RSE) and is represented as:

As stated, examples of Z include amides, alkoxides, and phenoxides. Illustrative amides include, but are not limited to, diisopropylamide and hexamethyldisilazide. Illustrative alkoxides include, but are not limited to, methoxide, ethoxide, n-propoxide, iso-propoxide, n-butoxide, sec-butoxide, tert-butoxide, and the like. Illustrative phenoxides include, but are not limited to, phenoxide. Examples of covalent anions bonded with Mg cations that are believed to be useful in practicing the invention include, but are not limited to, those described in Scheme I, and mixtures of any two or more thereof.

Scheme 1.

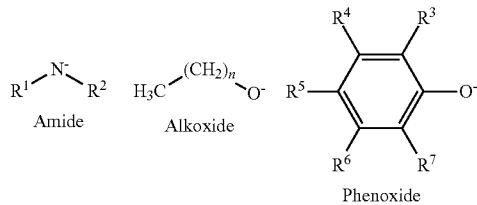

In Scheme 1 $R^1$ and $R^2$ are individually H, Me, Et, MeO, $CF_3$, tert-Bu, n-Bu, or $(CH_3)_3Si$, $R^3$, $R^4$, $R^5$, $R^6$ and $R^7$ are individually H, Me, Et, MeO, $CF_3$, tert-Bu, or n-Bu, and n is 0 to 8, inclusive.

Another important discovery is that $MgCl_2$ is soluble in organic solvents such as tetrahydrofuran (THF), with a solubility up to about 1M. Therefore, there are at least two ways of preparing the magnesium covalently-bonded salt/magnesium chloride complex. First, the magnesium covalent-bonded salt and the magnesium chloride may be dissolved together in an organic solvent. Second, the magnesium chloride may be dissolved first in the organic solvent, and the corresponding magnesium covalent-bonded salt added. With the readily changed ratios of magnesium covalent-bonded salt and the magnesium chloride, it is also possible to generalize formulas of the complexes that may be used in electrolytes for secondary Mg batteries, for electrochemical cells having Mg electrodes, and in energy storage devices having an Mg electrode. Both the magnesium covalent-bonded salt and the magnesium chloride concentration can vary as much as their solubility permits to give a more general formula.

In one aspect, an electrolyte is provided. The electrolyte may include a compound of formula $M^1X_n$, where $M^1$ is Mg, Ca, Sr, Ba, Sc, Ti, Al, or Zn, X is a group covalently bonded to $M^1$, and n is 1, 2, 3, 4, 5, or 6. Thus, the $M^1X_n$ is a covalently bonded metal salt complex. Where $M^1$ is magnesium, it is a magnesium covalent-bonded salt, as described above. The electrolyte may also include a compound of formula $M^2Z_m$, where $M^2$ is Mg, Ca, Sr, Ba, Sc, Ti, Al, or Zn; Z is a halogen or pseudo-halogen; and m is 1, 2, 3, 4, 5, or 6. The electrolyte, of course, also includes a solvent. Where $M^2$ is magnesium and Z is a halogen, the compound may be the magnesium halide (or chloride) as described above. Illustrative Z groups include, but are not limited to, F, Cl, Br, I, CN, SCN, or SeCN.

In any of the above embodiments, X may be group a covalently bonded to $M^1$. This may include, but is not limited to, where X is an amide, alkoxide, or phenoxide. Where X is an amide, it may be group of formula $NR^1R^2$, where $R^1$ and $R^2$ are individually H, Me, Et, MeO, $CF_3$, tert-Bu, n-Bu, or $(CH_3)_3Si$, and n is 1, or 2. Such groups result in compounds of formula $M^1(NR^1R^2)_n$. In any of the above embodiments, $R^1$ and $R^2$ may be $(CH_3)_3Si$ and n may be 2. Where X is an alkoxide, such compounds may be described by the formula $M^1(O(CH_2)_{n'}CH_3)_2$, wherein n' is from 0 to 20, inclusive. Where X is a phenoxide, it may be a group represented by the formula:

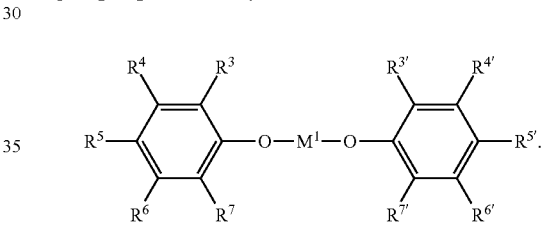

In the above formula, each $R^3$, $R^4$, $R^5$, $R^6$, $R^7$, $R^{3'}$, $R^{4'}$, $R^{5'}$, $R^{6'}$ and $R^{7'}$ is individually H, Me, Et, MeO, $CF_3$, tert-butyl, sec-butyl, or n-butyl. In some examples of the phenoxide compounds at least two of $R^3$, $R^4$, $R^5$, $R^6$, $R^7$, $R^{3'}$, $R^{4'}$, $R^{5'}$, $R^{6'}$ and $R^{7'}$ are the same. In other examples of the phenoxide compounds at two of $R^3$, $R^4$, $R^5$, $R^6$ and $R^7$ are the same. In other examples of the phenoxide compounds at least two of $R^{3'}$, $R^{4'}$, $R^{5'}$, $R^{6'}$ and $R^{7'}$ are the same. In other examples of the phenoxide compounds at least two of $R^3$, $R^4$, $R^5$, $R^6$ and $R^7$ are the same. In yet other examples of the phenoxide compounds at least two of $R^{3'}$, $R^{4'}$, $R^{5'}$, $R^{6'}$ and $R^{7'}$ are the same and at least two of $R^3$, $R^4$, $R^5$, $R^6$ and $R^7$ are the same. In some embodiments, at least two of $R^3$, $R^4$, $R^5$, $R^6$ and $R^7$ are tert-butyl, or at least two of $R^{3'}$, $R^{4'}$, $R^{5'}$, $R^{6'}$ and $R^{7'}$ are tert-butyl, or least two of $R^3$, $R^4$, $R^5$, $R^6$ and $R^7$ at least two of $R^{3'}$, $R^{4'}$, $R^{5'}$, $R^{6'}$ and $R^{7'}$ are tert-butyl. In one embodiment of the phenoxide, $R^3$, $R^7$, $R^{3'}$, and $R^{7'}$ are tert-butyl and $R^4$, $R^5$, $R^6$, $R^{4'}$, $R^{5'}$, and $R^{6'}$ are H. In any of the above alkoxides or phenoxide, $M^1$ may be Mg, Ca, Sr, Ba, Sc, Ti, Al, or Zn. In any of the above alkoxides or phenoxide, $M^1$ may be Mg.

In some embodiments, the electrolyte may include either $Mg_p$(hexamethyldisilazane)$_n Cl_q$ or $Mg(2,6$-di-t-butylphenoxide)$_2$. In these compounds p may be from 2 to 10, n may be from 1 to 10, and q may be from 2 to 10. In some illustrative embodiments, p is 3, 5, 7, or 9; n is 2, 4, 6, or 8, and q is 2, 4, 6, or 8. The compounds may include Mg(hexamethyldisilazane)$_{2/5}$Cl$_{8/5}$ or Mg(hexamethyldisilazane)$_{4/3}$Cl$_{2/3}$. As will be recognized by those of skill in the art, the fact that some compounds are presented with fractional amounts of certain ligands is immaterial to the other defined values as any of the fractional amounts may readily converted to whole number representations.

The compounds of formula $M^1X_n$ may be present in the electrolytes at a concentration that is sufficient for use in the intended battery applications. This may include concentrations of from about 0.01 M to about 2.0 M. This may include concentrations of about 0.05 M to about 1.25 M.

The metal halide or metal pseudo-halogen is a compound of formula $M^2Z_m$. $M^1Z_m$ may be a metal fluoride, metal chloride, metal bromide, metal iodide, metal thiocyanate, metal cyanate, or metal selenocyanate. The available metals for $M^2$ include, but are not limited to, Mg, Ca, Sr, Ba, Sc, Ti, Al, or Zn. In such compounds, $M^2$ may be magnesium, in one embodiment. In another embodiment, Z is chloride. $M^2Z_m$ may also be $MgCl_2$.

The compounds of formula $M^2Z_m$ may be present in the electrolytes at a concentration that is sufficient for use in the intended battery applications. This may include concentrations of from about 0.01 M to about 2.0 M. This may include concentrations of about 0.05 M to about 1.25 M.

In the electrolytes, the solvent may be any solvent that is suitable for ion conduction as well as being substantially non-reactive with the other components of the electrolyte or a battery containing the electrolyte under operating conditions. Illustrative types of solvents that may be used include, but are not limited to, an ether, a sulfoxide, a nitrile, an alkane, an aromatic, a carbonate, or an amine, or a combination of any two or more such solvents. Specific, illustrative examples of solvents include, but are not limited to, tetrahydrofuran, glyme, diglyme, triglyme, tetraglyme, a crown ether, dimethoxyethane, 1,3-dioxane, 1,4-dioxane, acetonitrile, sulfolane, hexane, heptane, octane, nonane, decane, benzene, toluene, propylene carbonate, ethylene carbonate, dimethyl carbonate, diethyl carbonate, tetramethylene sulfone, pentamethyldiethylene triamine, or hexamethyltriethylene tetramine.

In another aspect, rechargeable batteries are provided. The batteries may include a cathode, an anode, and any of the above electrolytes. As noted above, such batteries may be void of $AlCl_3$.

Cathodic materials for use in the rechargeable batteries are not particularly limited. The cathodic materials must be stable in the solvents and in the presence of the various electrolyte components. Illustrative materials that may be used as the cathodic material include, but are not limited to, $V_2O_5$, $Mo_6S_{8-x}Se_x$ ($0 \leq x \leq 1$), a hydrated vanadium bronze, orthorhombic $MoO_3$, cation deficient spinel $Mn_{2.15}CO_{0.37}O_4$, $MgMnSiO_4$, $MgCoSiO_4$, $MnO_2$, $Mg_{0.5}Ti_2(PO_4)_3$, or fluorinated graphite. In some embodiments, the cathode includes $Mo_6S_8$.

Anodic materials for use in the rechargeable batteries are not particularly limited. The anodic materials must be stable in the solvents and in the presence of the various electrolyte components. Illustrative materials that may be used as the anodic material include, but are not limited to, $Mg^0$, $TiO_2$, $TiS_2$, or amorphous carbon. In some embodiments, the anode includes $Mg^0$.

The rechargeable batteries may also include a separator located between the anode and the cathode. Such separators may prevent direct physical contact between the anode and cathode. The separators may be porous to allow for electron transport between the electrodes. Illustrative separators include, but are not limited to, a paper separator, a polymeric separator, a glass fiber separator, or a ceramic separator, or a combination thereof.

Where the rechargeable batteries contain magnesium, the battery is a rechargeable magnesium ion battery. Where the rechargeable batteries contain calcium, the battery is a rechargeable calcium ion battery. Where the rechargeable batteries contain zinc, the battery is a rechargeable zinc ion battery.

The present invention, thus generally described, will be understood more readily by reference to the following examples, which are provided by way of illustration and are not intended to be limiting of the present invention.

EXAMPLES

General. All chemicals used in the synthesis of Reverse Schlenk Equilibrium (RSE) magnesium electrolytes were purchased from commercial suppliers and used without further purification. Magnesium hexamethyldisilazane, magnesium dichloride, 2,4-di-t-butyphenol, anhydrous tetrahydrofuran (THF) were purchased from Aldrich. Magnesium isopropyl amide was purchased as a 0.7 M solution in THF. The THF was removed to prepare a pure salt of magnesium isopropyl amide solid. Dibutyl magnesium as a 1.0 M heptane solution was purchased from Sigma Aldrich. Newly synthesized RSE compounds were characterized by $^1H$, $^{13}C$, and $^{25}Mg$ NMR spectroscopy, using a 300 MHz spectrometer. All chemical shift values ($\delta$) are reported in ppm, referenced relative to TMS ($^1H$ and $^{13}C$) or $MgCl_2$ ($^{25}Mg$).

Electrochemical Measurements. Cyclic voltammetry (CV) was characterized on a three-electrode configuration with working electrode such as a platinum disk (2 mm in diameter, CH instruments, Austin, Tex.), with counter and reference electrodes of Mg ribbons (99.9% purity, Sigma-Aldrich). The working electrodes such as platinum disk, gold disk and glassy carbon, were polished with a corundum suspension and rinsed with dry acetone before use. Three continuous CV scans were obtained to evaluate the deposition and dissolution performance of the MgHDMS.4MgCl. Ionic conductivity was measured by impedance spectroscopy, and an aqueous solution of 0.1 M KCl was used as a reference to calibrate the ionic conductivity cells.

Chronocoulometry (CC) methods were applied to evaluate the diffusion coefficient of the cations in the electrolyte with the same experimental setup for the CV characterization. The potential at the working electrode was set at −0.5 V vs. $Mg/Mg^{2+}$ for 120 seconds allowing for the reduction of $Mg^{2+}$ based cations at the surface of the working electrode. All of the electrochemical characterizations were carried out on a multi-channel potentiostat (Parstat M C, Princeton Applied Research, TN) under an argon atmosphere in a glove box. Integration of the Faradic current density over time was obtained and plotted against the square root of time. Diffusion coefficient at each concentration was determined by fitting Q versus $t^{1/2}$ according to Eq. 1 derived from the Cottrell equation.

$$Q=(2nFAC_oD^{1/2}/\pi^{1/2})t^{1/2}+Q_{dl}+Q_{ads} \qquad \text{Eq. 1}$$

The parameters of Eq. 1 are defined as follows: n is the number of electrons for the reduction reaction that occurs at the working electrode (n=2); F is the Faraday constant; A is the area of the electrode (0.0314 cm$^2$ for the above); $Q_{dl}$ is the capacitive charge; and $Q_{ads}$ is the charge contributed from the absorbed species. $C_o$ is the bulk magnesium ion concentration (mol/cm$^3$) and D is the magnesium ion diffusion coefficient in the electrolyte (cm$^2$/s).

The cell cycling tests and cyclic voltammetry were conducted using 2032 coin cells. All cells were cycled with C/10 current on a MACOOR series 4000 cycler within a voltage range of 0.2-1.6V at room temperature.

Example 1

Synthesis of a metal amide—metal chloride.

Electrochemically active Mg(HMDS)$_2$ vs. MgCl$_2$ in a 2:1 ratio, i.e. 1.5M Mg(HMDS)$_{4/3}$Cl$_{2/3}$ may be prepared according Scheme 1.

Scheme 1:

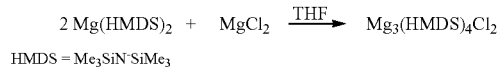

HMDS = Me$_3$SiN⁻SiMe$_3$

Magnesium bis(hexamethyldisilazide) (Mg(HMDS)$_2$; 0.67 g), magnesium chloride (MgCl$_2$; 0.095 g), and anhydrous tetrahydrofuran (THF, 2 ml, water content<50 ppm) were placed into a glass container and the mixture was stirred at 30° C. for 48 hours, under an inert atmosphere. The MgCl$_2$ salt slowly dissolved. Alternatively, the solution may be formed at room temperature, with a longer stirring time. The solution formed was 1.5 M in Mg(HMDS)$_{4/3}$Cl$_{2/3}$.

FIG. 1 is a cyclic voltammogram of an all-magnesium complex dissolved in tetrahydrofuran (THF) using a platinum working electrode, a Mg counter electrode, and a Mg reference electrode. The voltammogram illustrates the significant hysteresis between Mg plating and stripping. It is noteworthy that reversible Mg plating and stripping can be achieved, and the coulombic efficiency is 85%.

Example 2

An electrochemically active Mg amide/Mg chloride (1:1 ratio) solution. A solution of 0.5 M Mg(HMDS)Cl was formed as above from Mg(HMDS)$_2$ (0.345 g) and MgCl$_2$ (0.095 g) in THF (4 mL).

Figure 2:
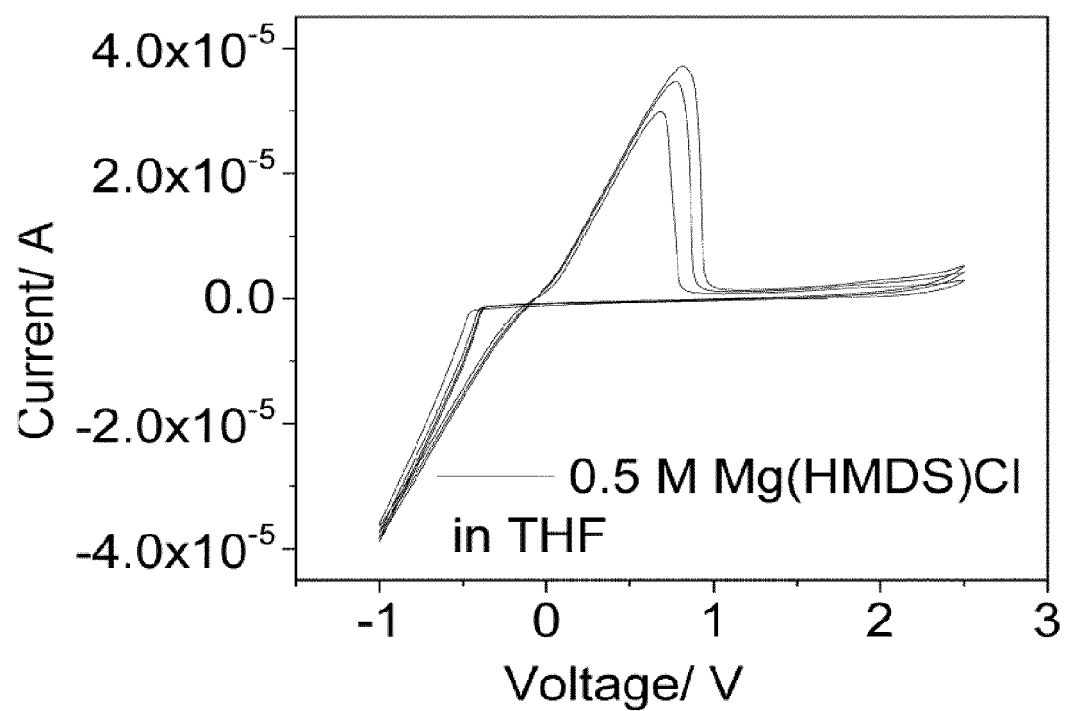
FIG. 2 is cyclic voltammetry (CV) graph of a 0.5 M THF solution Mg(HMDS)Cl salts at a Pt working electrode, at a scan rate of 100 mV s$^{-1}$ using Mg as reference and counter electrode, according to the examples.

FIG. 2 is a cyclic voltammogram of the solution in THF using a platinum working electrode, a Mg counter electrode, and a Mg reference electrode. It is noteworthy that reversible Mg plating and stripping can be achieved, and the coulombic efficiency is 62%.

Example 3

An electrochemically active Mg amide/Mg chloride (1:2 ratio) solution. A solution of 0.75 M Mg(HMDS)$_{2/3}$Cl$_{4/3}$ was formed as above from Mg(HMDS)$_2$ (0.345 g) and MgCl$_2$ (0.190 g) in THF (2 mL).

Figure 3:
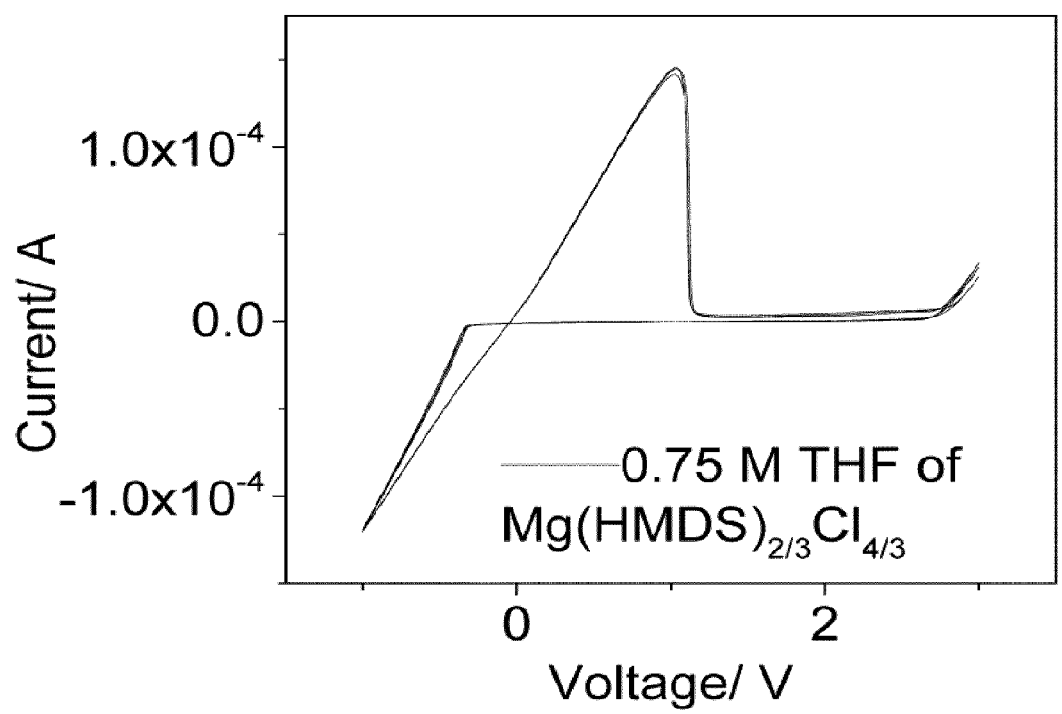
FIG. 3 is cyclic voltammetry (CV) graph of a 0.75 M THF solution Mg(HMDS)$_{2/3}$Cl$_{4/3}$ salts at a Pt working electrode, at a scan rate of 100 mV s$^{-1}$ using Mg as reference and counter electrode, according to the examples.

FIG. 3 is a cyclic voltammogram of the solution in THF using a platinum working electrode, a Mg counter electrode, and a Mg reference electrode. It is noteworthy that reversible Mg plating and stripping can be achieved, and the coulombic efficiency is 95%.

Example 4

An electrochemically active Mg amide/Mg chloride (1:4 ratio) solution. A solution of 1.0 M Mg(HMDS)$_{2/5}$Cl$_{8/5}$ was formed as above from Mg(HMDS)$_2$ (0.345 g) and MgCl$_2$ (0.380 g) in THF (2 mL).

Figure 4:
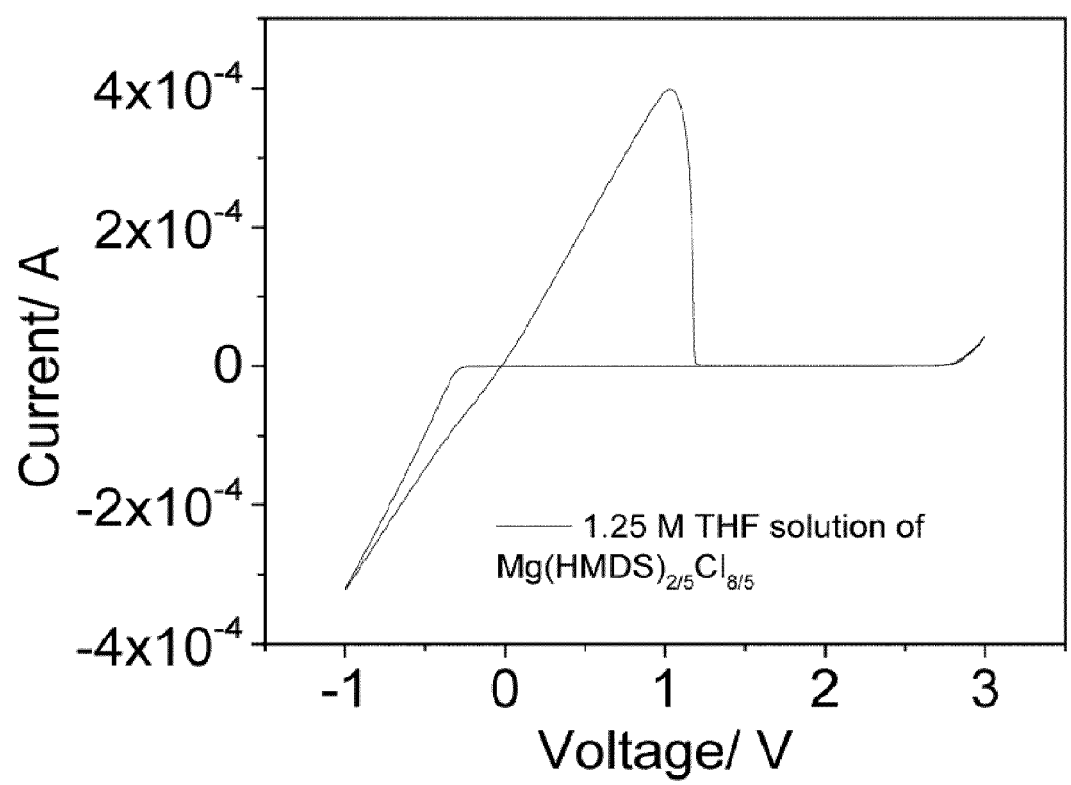
FIG. 4 is cyclic voltammetry (CV) graph of a 1.0 M THF solution of magnesium amide/chloride salts at a Pt working electrode at a scan rate of 100 mV s$^{-1}$ using Mg as reference and counter electrode, according to the examples.
Figure 5A:
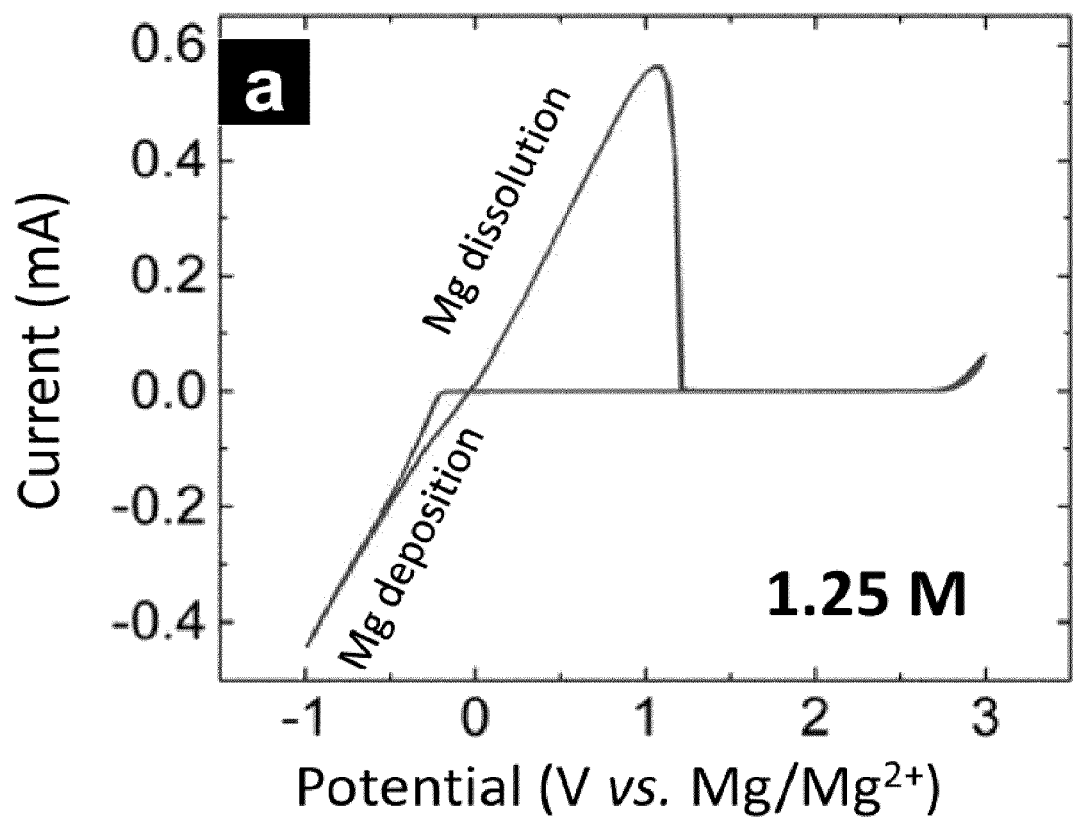
FIGS. 5a-d are cyclic voltammogram of THF solutions of magnesium amide/chloride salts at a Pt working electrode at a scan rate of 100 mV s$^{-1}$ using Mg as reference and counter electrode, where
Figure 5B:
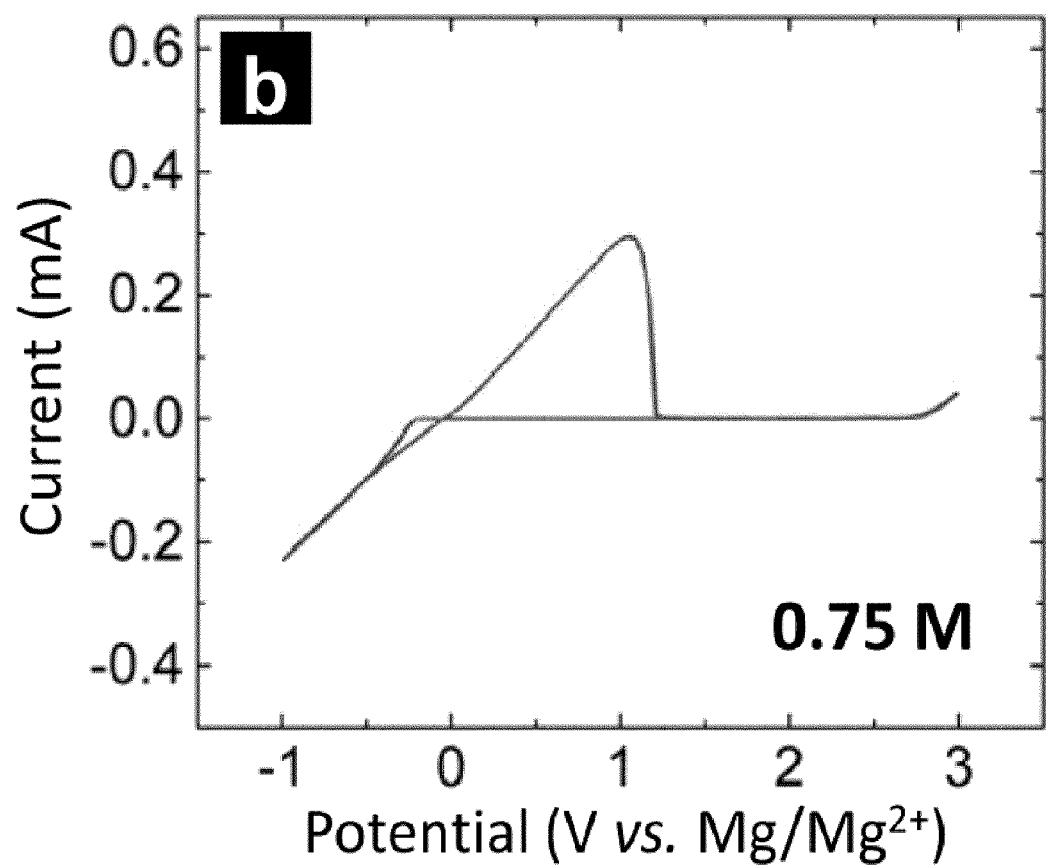
Figure 5C:
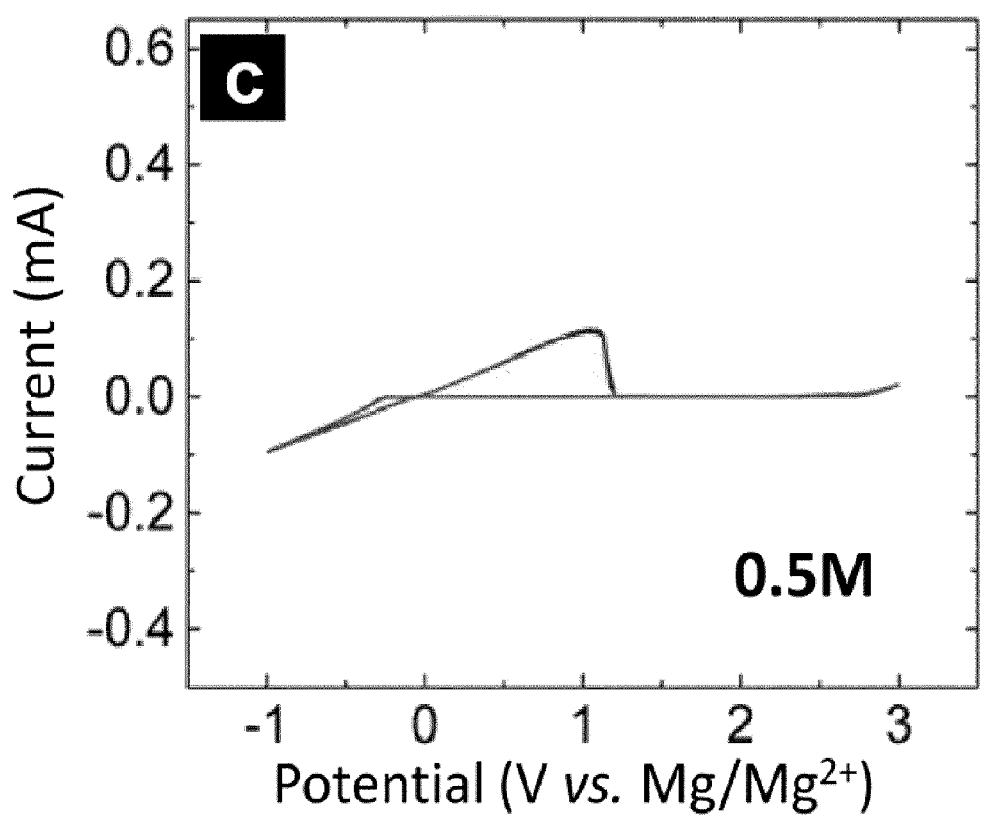
Figure 5D:
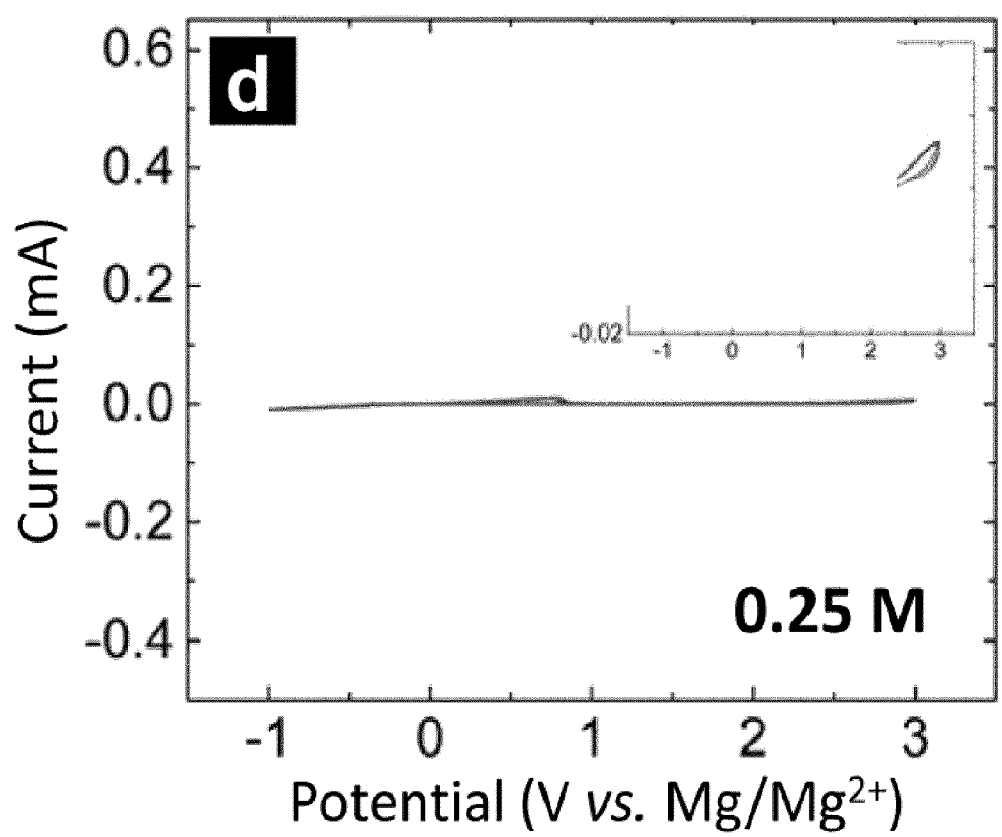

FIG. 4 is a cyclic voltammogram of the solution in THF using a platinum working electrode, a Mg counter electrode, and a Mg reference electrode. It is noteworthy that reversible Mg plating and stripping can be achieved, and the coulombic efficiency is 99%.

Example 5

Cyclic Voltammograms of Mg(HMDS)$_{2/5}$Cl$_{8/5}$ (Mg(HMDS)$_2$-4MgCl$_2$) in THF at different concentrations. FIGS. 5 (a-d) depict representative cyclic voltammograms of different concentrations (0.25 M, 0.50 M, 0.75 M, and 1.25 M) of Mg(HMDS)$_{2/5}$Cl$_{8/5}$ dissolved in THF using a platinum working electrode, Mg for the counter and reference electrodes. The voltammograms illustrate the significant hysteresis between Mg plating and stripping. The current density drops almost 50 times when the concentration decreases from 1.25 M to 0.25 M.

Example 6

Ionic Conductivity Mg(HMDS)$_{2/5}$Cl$_{8/5}$ (Mg(HMDS)$_2$-4MgCl$_2$) in THF at different concentrations. The bulk ionic conductivity was measured by ac impedance spectroscopy using a Solartron Instrument in the frequency range from 3×10$^{-5}$ Hz to 1 Hz with a perturbation amplitude of 5 mV. The measurement of the samples was carried out in a self-made conductivity cell with two Stainless Steel electrodes. The cell was placed in an oven which was heated from 10° C. to 60° C., with an equilibration time of 30 min at each measuring temperature. The ionic conductivity, σ, of the electrolyte was calculated by Eq. 1, where l is the distance between the two stainless steel plates, A is the area of the spacers, and R is the resistance:

$$\sigma = l/(A*R) \qquad \text{Eq. 1}$$

Figure 6:
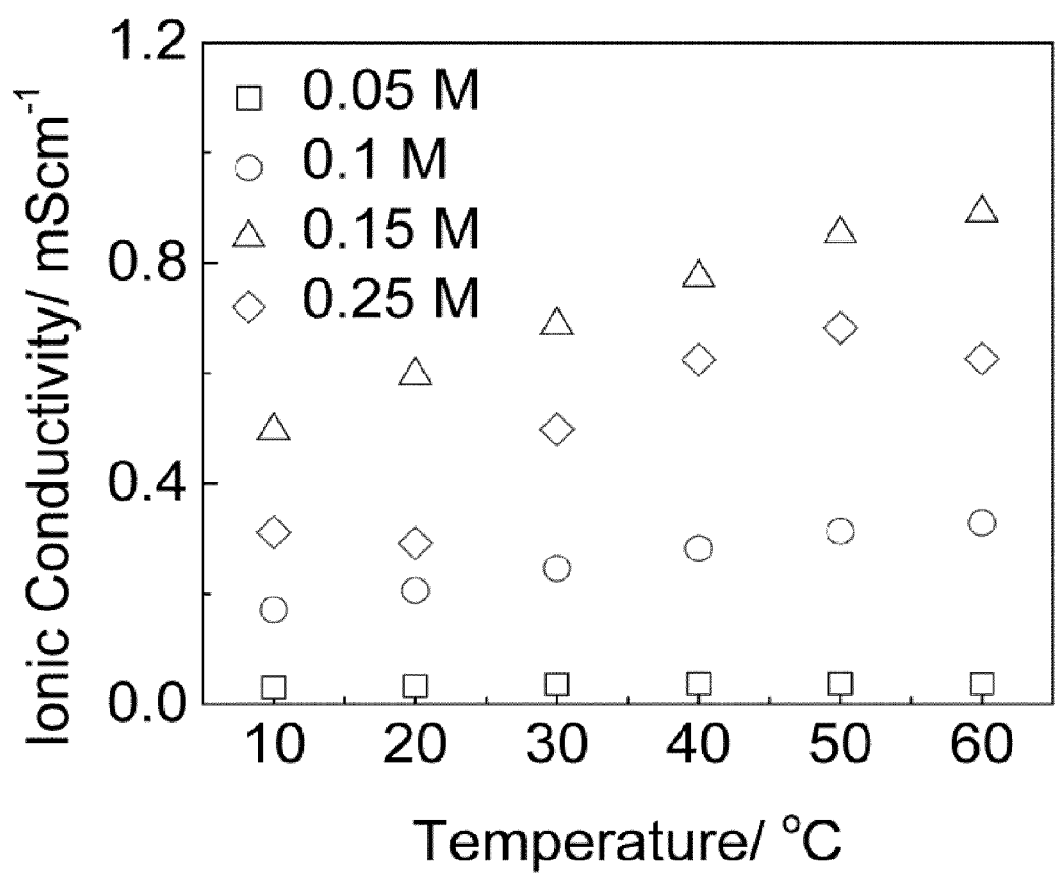
FIG. 6 is a graph of temperature dependence on ionic conductivity for different concentrations of Mg(HMDS)$_{2/5}$Cl$_{8/5}$ in THF, according to the examples.

FIG. 6 is a graph illustrating the temperature dependence of ionic conductivity of Mg(HMDS)$_{2/5}$Cl$_{8/5}$ solutions at different concentrations. As illustrated in FIG. 6, the ionic conductivity increases quickly with temperature.

Example 7

Figure 7:
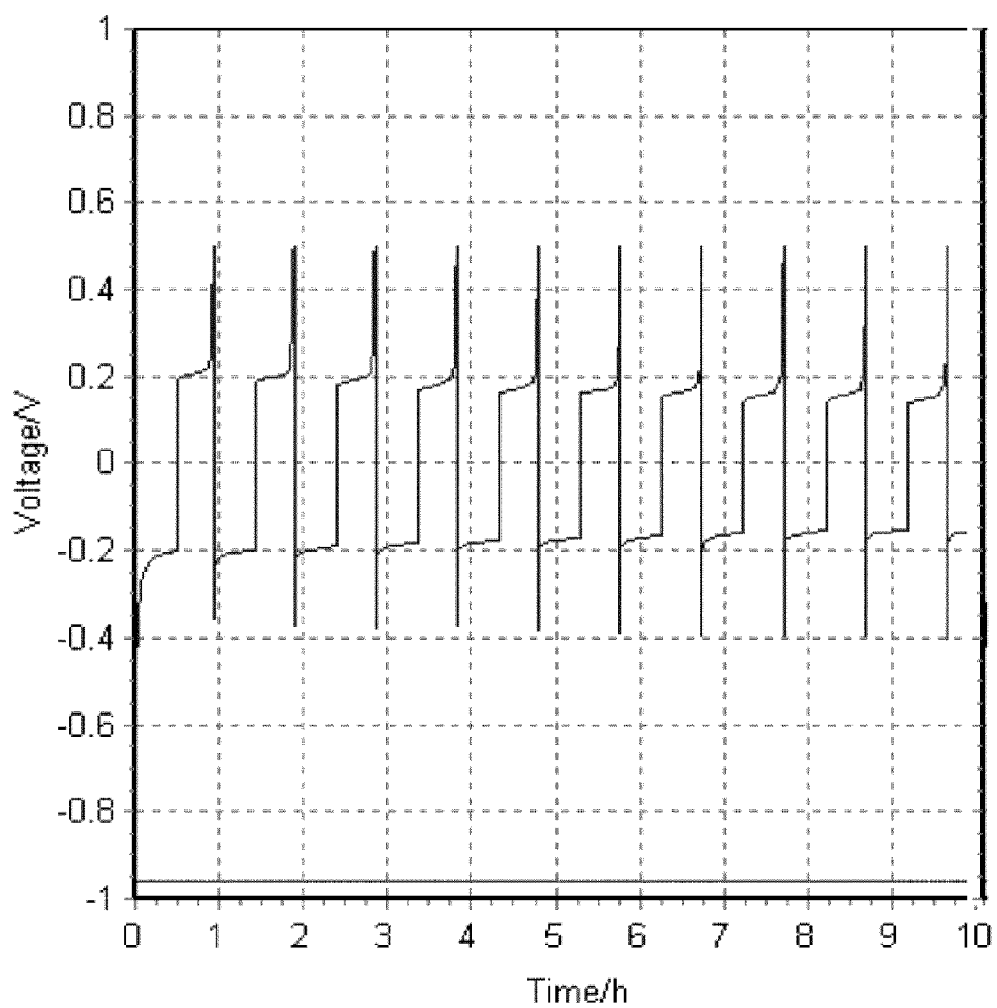
FIG. 7 is a graph illustrating the first 10 cycling profiles of a coin cell with magnesium amide and magnesium chloride THF solutions for the Mg deposition/stripping in 1.0 M Mg(HMDS)$_{4/3}$Cl$_{2/3}$ electrolyte on a Cu electrode under a current density of 100 µAcm$^{-2}$.

Use of magnesium amide and magnesium chloride THF solutions for the Mg deposition/stripping in 1.0 M Mg(HMDS)$_{4/3}$Cl$_{2/3}$ electrolyte on a Cu electrode under a current density of 100 μAcm$^{-2}$. FIG. 7 shows the first 10 cycling profiles.

Figure 8:
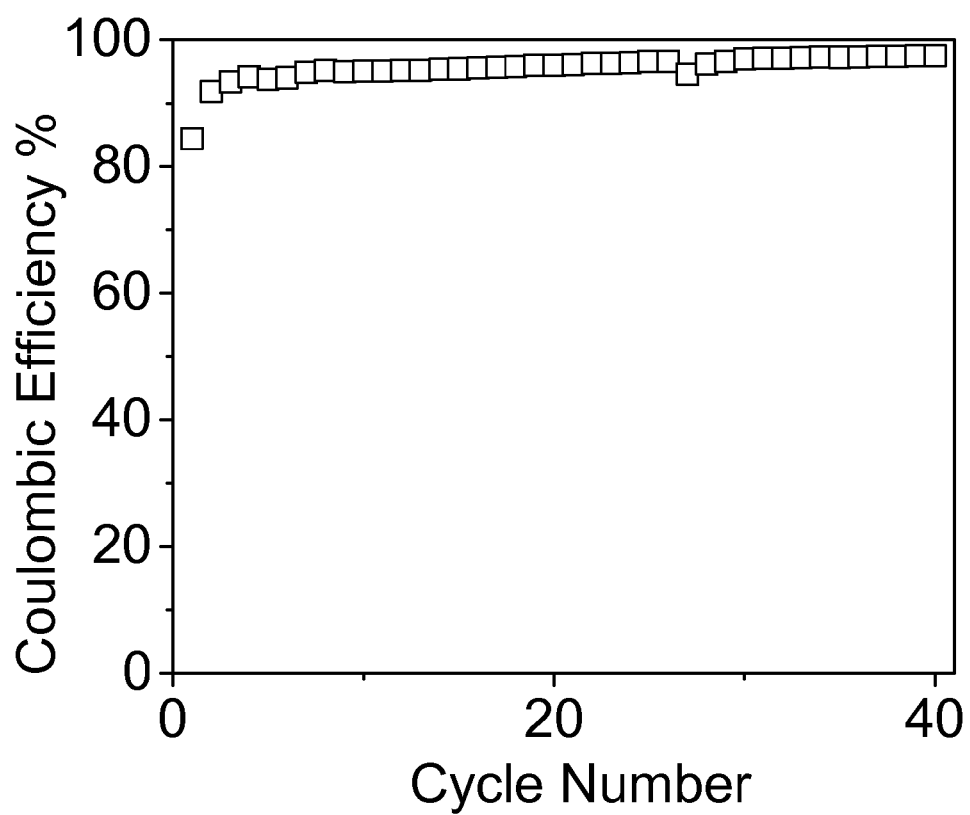
FIG. 8 is a graph illustrating the coulombic efficiency of Mg deposition/stripping from a 1.0 M Mg(HMDS)$_{4/3}$Cl$_{2/3}$ electrolyte on a Cu electrode under a current density of 100 µA cm$^{-2}$ (a shows the first 10 cycle profiles), according to the examples.

Electrochemical magnesium deposition and dissolution on polished Cu pieces were examined with standard 2032 coin cells. A Polished magnesium disk was used as counter electrode, and the cells used a glass filter as a separator. The cells were assembled in a glove box containing less than 1 ppm water and O$_2$. A constant deposition current density of 0.1 mA cm$^{-2}$ was passed through the cell for 1 h, and then the same dissolution current density was applied until a cut-off voltage of 0.5 V vs. Mg. FIG. 8 shows the coulombic efficiency of Mg deposition/stripping in 1.0 M Mg(HMDS)$_{4/3}$Cl$_{2/3}$ electrolyte on the Cu electrode under a current density of 100 μA cm$^{-2}$.

Example 8

Mo$_6$S$_8$ Chevrel Phase battery cycling with 0.75 M Mg(HMDS)$_2$-4MgCl$_2$. The Chevrel Phase Mo$_6$S$_8$ Electrochemical experiments were carried out using coin cells. The electrodes were prepared by apply a mixture of as-synthesized Mo$_6$S$_8$ was prepared by the molten salt method.

Figure 9:
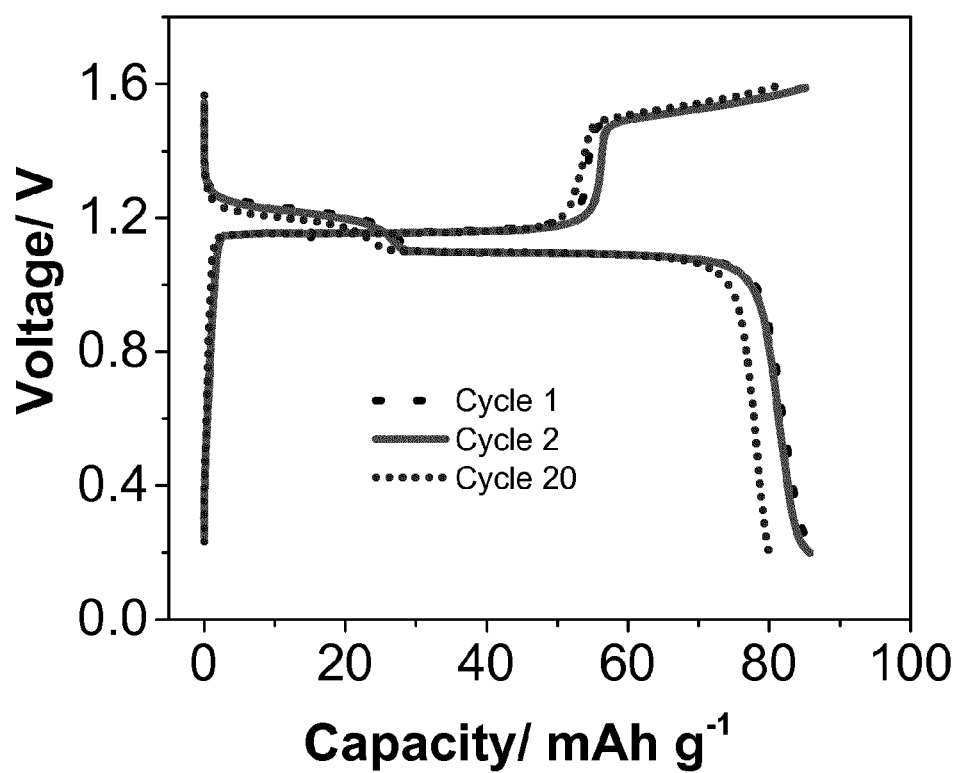
FIG. 9 is a graph of discharge/charge curves of the Mg—Mo$_6$S$_8$ cells at a current rate of 0.1 C in 0.75 M Mg(HMDS)$_{2/5}$Cl$_{8/5}$ (Mg(HMDS)$_2$-4MgCl$_2$) electrolyte at 55° C., according to the examples.
Figure 10:
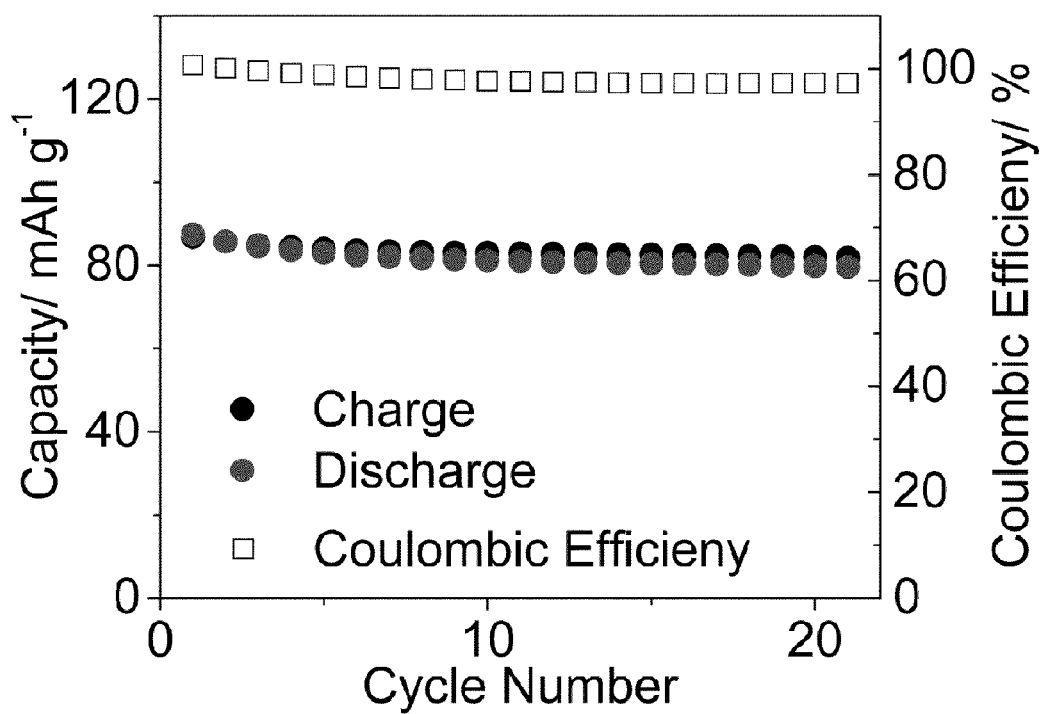
FIG. 10 is a graph of cycling performance of the Mg—Mo$_6$S$_8$ cells at a current rate of 0.1 C in 0.75 M Mg(HMDS)$_{2/5}$Cl$_{8/5}$ (Mg(HMDS)$_2$-4MgCl$_2$) electrolyte at 55° C., according to the examples.

Mo$_6$S$_8$, carbon black and PTFE (weight-ratio: 80:10:10) onto a stainless steel mesh. The loading of active material is between 3.0 and 15.0 mg. The batteries were assembled as 2032-type coin cells inside an argon-filled glovebox by using the Mo$_6$S$_8$ as the cathode electrode, magnesium metal as the anode electrode, glass fiber membrane (Whatman, GF/D) as the separator. Galvanostatic discharge-charge experiments were tested in the voltage range of 0.2-1.6 V on an MACOOR battery test system at different temperatures. FIG. 9 is a graph of the discharge/charge curves of the Mg—Mo$_6$S$_8$ cells at a current rate of 0.1 C in 0.75 M Mg(HMDS)$_{2/5}$Cl$_{8/5}$ (Mg(HMDS)$_2$/4MgCl$_2$) electrolyte at 55° C., while FIG. 10 is a graph illustrating the cycling performance under the same conditions.

Example 9

Figure 11:
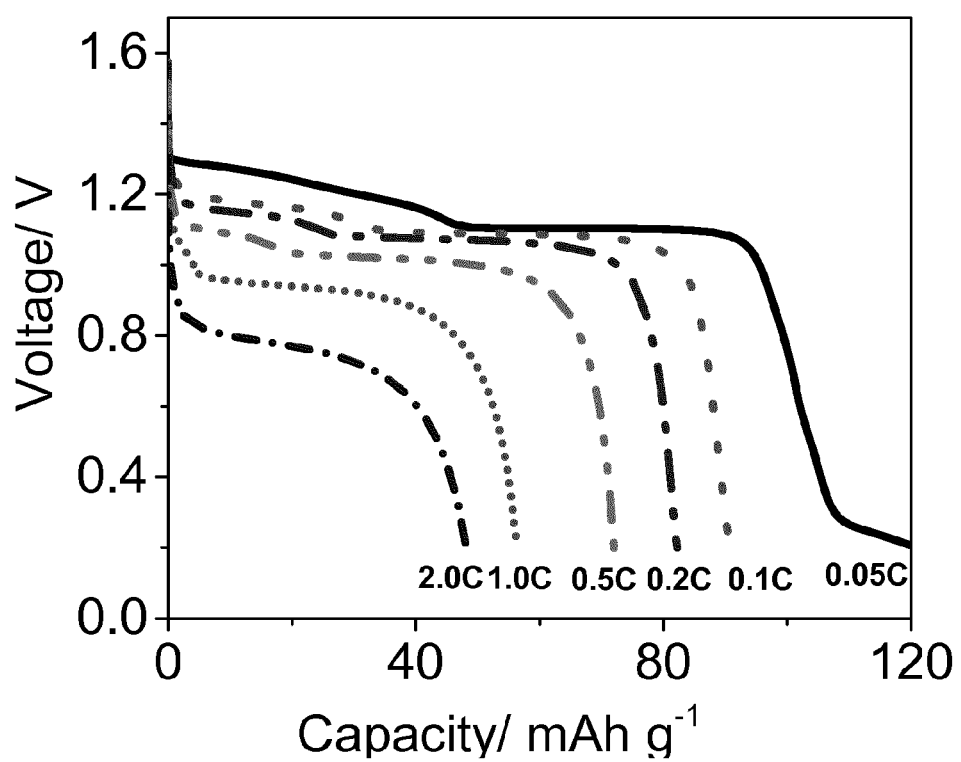
FIG. 11 is a graph of discharge/charge curves of the Mg—Mo$_6$S$_8$ cells at a varying current rates in 0.75 M Mg(HMDS)$_{2/5}$Cl$_{8/5}$ (Mg(HMDS)$_2$-4MgCl$_2$) electrolyte at 55° C., according to the examples.
Figure 12:
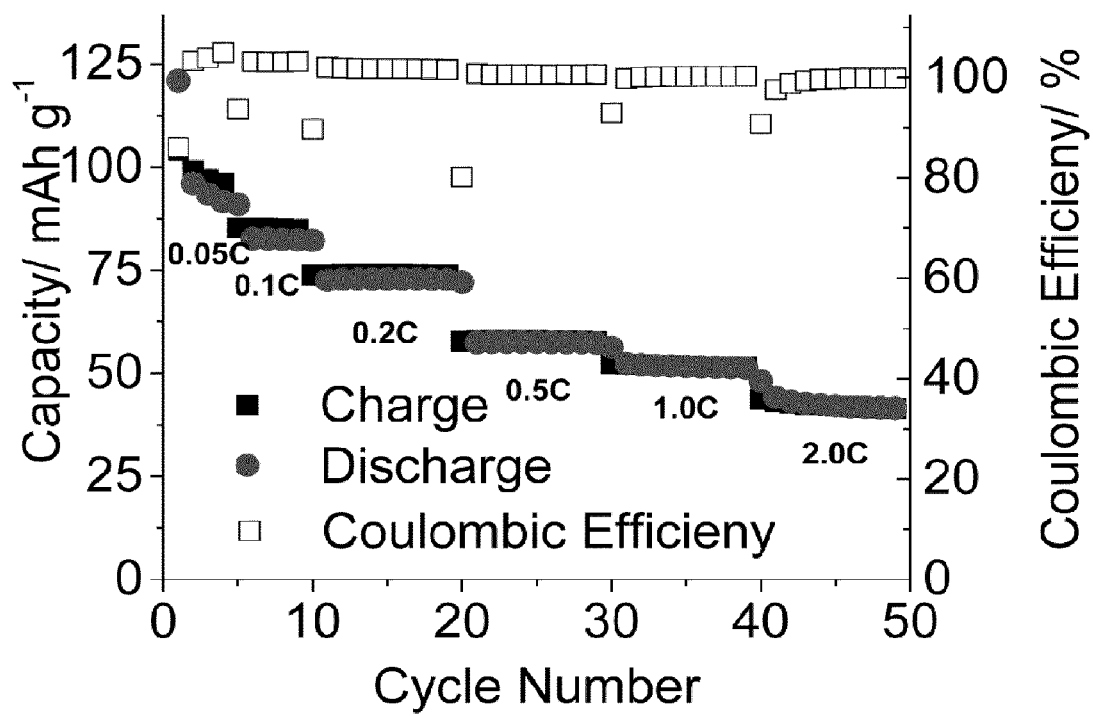
FIG. 12 is a graph of cycling performance of the Mg—Mo$_6$S$_8$ cells at varying current rates in 0.75 M Mg(HMDS)$_{2/5}$Cl$_{8/5}$ (Mg(HMDS)$_2$-4MgCl$_2$) electrolyte at 55° C., according to the examples.

Rate Performance of Mo$_6$S$_8$ Chevrel Phase battery cycling with 0.75 M Mg(HMDS)$_2$-4MgCl$_2$. The Chevrel Phase Mo$_6$S$_8$ was prepared by a molten salt method. See Lancry, E. et al. *J. Solid State Chemistry* 179(6): p. 1879-1882 (2006). Electrochemical experiments were carried out using coin cells. The electrodes were prepared by applying a mixture of as-synthesized Mo$_6$S$_8$, carbon black, and PTFE (weight-ratio: 80:10:10) onto a stainless steel mesh. The loading of active material is between 3.0 and 15.0 mg. The batteries were assembled as 2032-type coin cells inside an argon-filled glovebox by using the Mo$_6$S$_8$ as the cathode electrode, magnesium metal as the anode electrode, and glass fiber membrane (Whatman, GF/D) as the separator. Galvanostatic discharge-charge experiments were tested in the voltage range of 0.2-1.6 V on an MACCOR battery test system at different temperatures. FIG. 11 illustrates the discharge/charge curves of the Mg—Mo$_6$S$_8$ cells at a current rate of 0.1 C in 0.75 M Mg(HMDS)$_{2/5}$Cl$_{8/5}$ (Mg(HMDS)$_2$-4MgCl$_2$) at 55° C., while FIG. 12 illustrates the current rates of 0.05 C, 0.1 C, and higher rates at 55° C.

Examples Showing the Cyclic Voltammetry of a Variety of Magnesium Alkoxide and Magnesium Chloride Solutions Example 10

Synthesis of a Metal Alkoxide/Metal Chloride. In a typical preparation of an electrochemically active Mg alkoxide/Mg chloride solution such as 0.4 M magnesium bis (2,6-di-tert-butylphenoxide) versus 1.0 M MgCl$_2$, such as 1.0 M Mg(HMDS)$_{2/5}$Cl$_{8/5}$, one may undertake the following reaction:

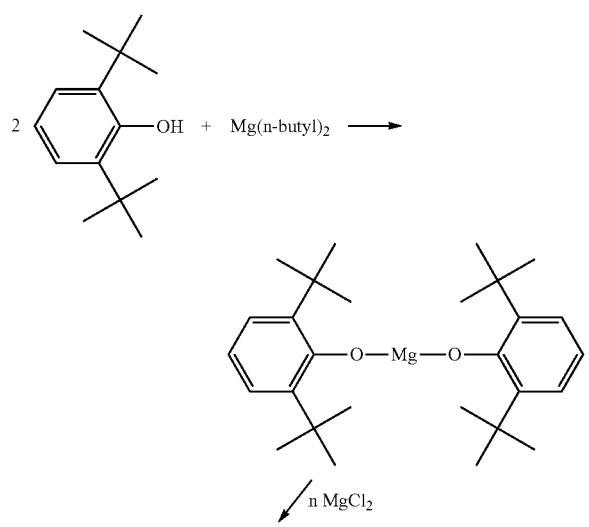

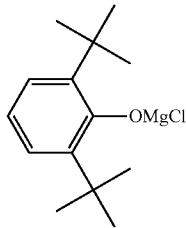

Figure 13:
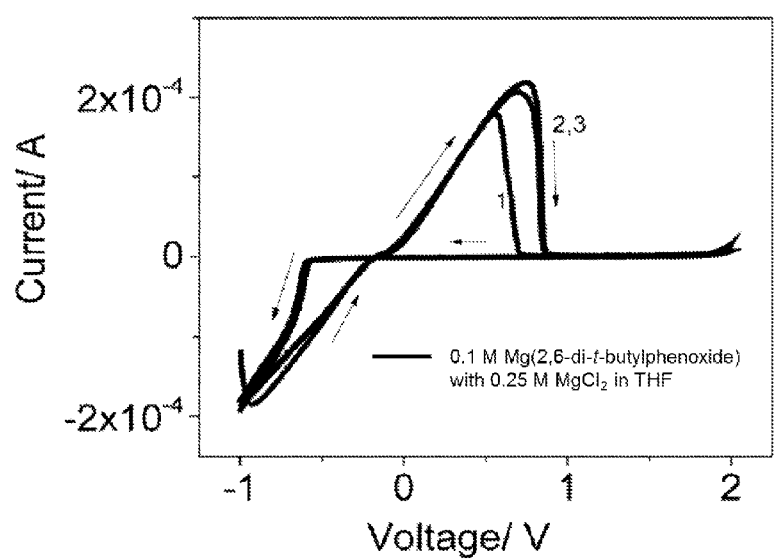
FIG. 13 is cyclic voltammetry (CV) graph of a 0.1 M Mg bis(2,6-di-tert-butylphenoxide) v. 0.25 M MgCl$_2$ in THF solution at a Pt working electrode, at a scan rate of 100 mV s$^{-1}$ using Mg as reference and counter electrode, according to the examples.

Magnesium bis (2,6-di-tert-butylphenoxide) (0.8 g) and magnesium chloride (MgCl$_2$, 0.380 g), and 2 mL of anhydrous tetrahydrofuran (THF, water content<50 ppm) were placed into a single glass container and the mixture was stirred at 30° C. for 48 hours or longer under inert atmosphere. The MgCl$_2$ salt slowly dissolves and a clear solution is obtained. FIG. 13 is a cyclic voltammogram of 0.1M magnesium bis (2,6-di-tert-butylphenoxide) versus 0.25 M MgCl$_2$ THF solutions at the Pt working electrode at a scan rate of 100 mV s$^{-1}$ using Mg as reference and counter electrode.

Example 11

Figure 14:
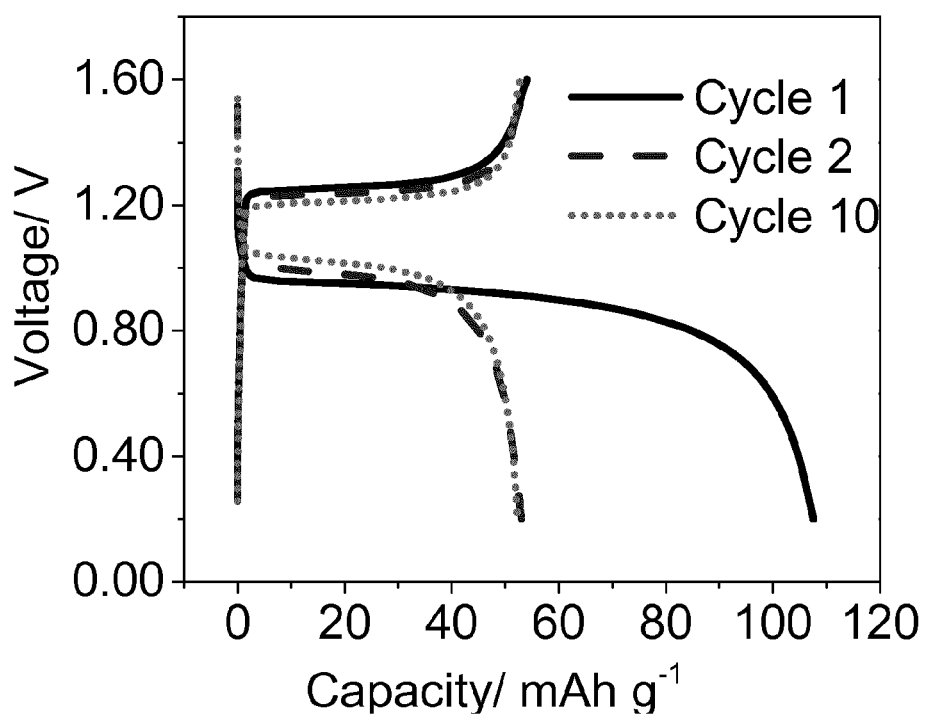
FIG. 14 is a graph of cycling performance of the Mg—Mo$_6$S$_8$ cells at a current rate of 0.1 C in 0.1 M magnesium bis (2,4-di-t-butylphenoxide) versus 0.25 M MgCl$_2$ electrolyte at 20° C., according to the examples.
Figure 15:
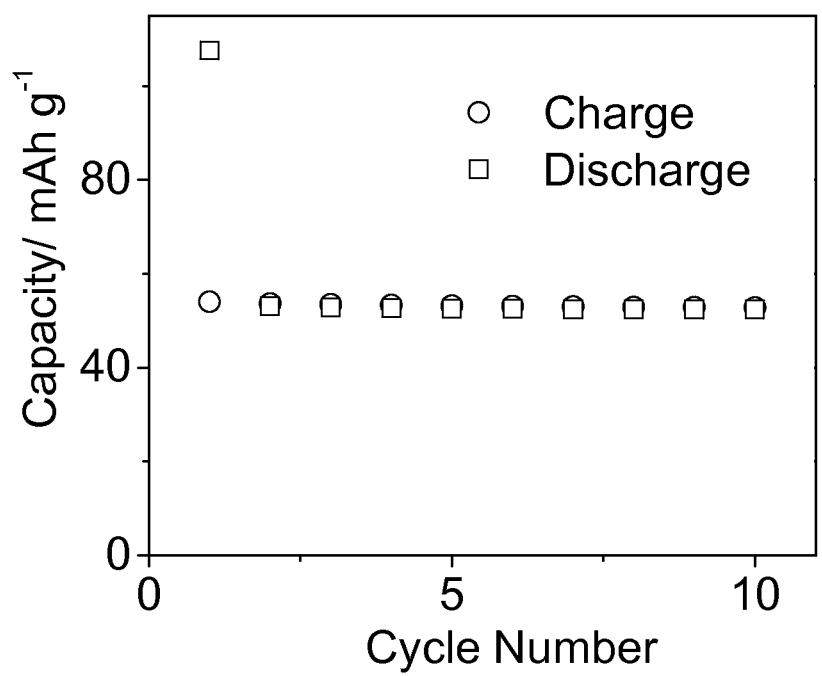
FIG. 15 is a graph of cycling performance of the Mg—Mo$_6$S$_8$ cells at a current rate of 0.1 C in 0.1 M Mg bis(2,6-di-tert-butylphenoxide) v. 0.25 M MgCl$_2$ in THF at 20° C., according to the examples.

Mo$_6$S$_8$ Chevrel phase battery cycling with 0.1 M magnesium bis (2,6-di-tert-butylphenoxide) versus 0.25 M MgCl$_2$. The Chevrel Phase Electrochemical experiments were carried out using coin cells. The electrodes were prepared by apply a mixture of as-synthesized Mo$_6$S$_8$ was prepared by the molten salt method. Mo$_6$S$_8$, carbon black and PTFE (weight-ratio: 80:10:10) was applied to a stainless steel mesh. The loading of the active material is between 3.0 and 15.0 mg. The batteries were assembled as 2032-type coin cells inside an argon-filled glovebox by using the Mo$_6$S$_8$ as the cathode electrode, magnesium metal as the anode electrode, glass fiber membrane (Whatman, GF/D) as the separator. Galvanostatic discharge-charge experiments were tested in the voltage range of 0.2-1.6 V on an MACCOR battery test system at different temperatures. FIG. 14 shows the cycling performance of the Mg—Mo$_6$S$_8$ cells at a current rate of 0.1 C in 0.1 M magnesium bis (2,6-di-tert-butylphenoxide) versus 0.25 M MgCl$_2$ electrolyte at 20° C. As illustrated in FIG. 14, a capacity over 55 mAh g$^{-1}$ can be achieved. FIG. 15 is a graph of the cycling performance of the Mg—Mo$_6$S$_8$ cells at a current rate of 0.1 C in 0.1 M magnesium bis (2,6-di-tert-butylphenoxide) versus 0.25 M MgCl$_2$ electrolyte at 20° C.

Example 12

A Mo$_6$S$_8$ Chevrel Phase battery cycling with 1.0 M Mg(HMDS)$_{4/3}$Cl$_{2/3}$. The Chevrel Phase Mo$_6$S$_8$ was prepared as in Example 9. Electrochemical experiments were carried out using coin cells. The electrodes were prepared by applying a mixture of as-synthesized Mo$_6$S$_8$, carbon black, and PTFE (weight-ratio: 80:10:10) onto a stainless steel mesh. The loading of active material is between 3.0 and 15.0 mg. The batteries were assembled as 2032-type coin cells inside an argon-filled glovebox by using the Mo$_6$S$_8$ as the cathode electrode, magnesium metal as the anode electrode, and glass fiber membrane (Whatman, GF/D) as the separator.

Example 13

Mo$_6$S$_8$ Chevrel Phase battery cycling with 0.25 M Mg(HMDS)$_{4/3}$Cl$_{2/3}$. The Chevrel Phase Mo$_6$S$_8$ was prepared as in Example 9. Electrochemical experiments were carried out using coin cells. The electrodes were prepared by apply a mixture of as-synthesized $Mo_6S_8$, carbon black and PTFE (weight-ratio: 80:10:10) onto a stainless steel mesh. The loading of active material is between 3.0 and 15.0 mg. The batteries were assembled as 2032-type coin cells inside an argon-filled glovebox by using the $Mo_6S_8$ as the cathode electrode, magnesium metal as the anode electrode, and a glass fiber membrane (Whatman, GF/D) as the separator. Galvanostatic discharge-charge experiments were tested in the voltage range of 0.2-2.0 V on an MACCOR battery test system at different temperatures.

While certain embodiments have been illustrated and described, it should be understood that changes and modifications can be made therein in accordance with ordinary skill in the art without departing from the technology in its broader aspects as defined in the following claims.

The embodiments, illustratively described herein may suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

The present disclosure is not to be limited in terms of the particular embodiments described in this application. Many modifications and variations can be made without departing from its spirit and scope, as will be apparent to those skilled in the art. Functionally equivalent methods and compositions within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can of course vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

Other embodiments are set forth in the following claims.

What is claimed is:

1. An electrolyte comprising:
   $Mg_p$(hexamethyldisilazane)$_n$Cl$_q$ wherein p is 3, 5, 7, or 9; n is 2, 4, 6, or 8, and q is 2, 4, 6, or 8; or
   $Mg(2,6$-di-t-butylphenoxide$)_2$ and $MgCl_2$;
   wherein the electrolyte is free of aluminum.

2. The electrolyte of claim 1 further comprising a solvent.

3. The electrolyte of claim 2, wherein the solvent is tetrahydrofuran, glyme, diglyme, triglyme, tetraglyme, a crown ether, dimethoxyethane, 1,3-dioxane, 1,4-dioxane, acetonitrile, sulfolane, hexane, heptane, octane, nonane, decane, benzene, toluene, propylene carbonate, ethylene carbonate, dimethyl carbonate, diethyl carbonate, tetramethylene sulfone, pentamethyldiethylene tri amine, or hexamethyltriethylene tetramine.

4. The electrolyte of claim 1 comprising $Mg_5$(hexamethyldisilazane)$_2$Cl$_8$ or $Mg_3$(hexamethyldisilazane)$_4$Cl$_2$.

5. The electrolyte of claim 1 which is void of $AlCl_3$.

6. The electrolyte of claim 1 comprising the $Mg_p$(hexamethyldisilazane)$_n$Cl$_q$.

7. A rechargeable battery comprising:
   a cathode;
   an anode; and
   an electrolyte comprising:
      $Mg_p$(hexamethyldisilazane)$_n$Cl$_q$ or $Mg(2,6$-di-t-butylphenoxide$)_2$
      wherein:
         the electrolyte is free of aluminum;
         p is 3, 5, 7, or 9;
         n is 2, 4, 6, or 8; and
         q is 2, 4, 6, or 8.

8. The battery of claim 7 which is a rechargeable magnesium ion battery.

9. The battery of claim 7, wherein the electrolyte further comprises a solvent.

10. The battery of claim 9, wherein the solvent is tetrahydrofuran, glyme, diglyme, triglyme, tetraglyme, a crown ether, dimethoxyethane, 1,3-dioxane, 1,4-dioxane, acetonitrile, sulfolane, hexane, heptane, octane, nonane, decane, benzene, toluene, propylene carbonate, ethylene carbonate, dimethyl carbonate, diethyl carbonate, tetramethylene sulfone, pentamethyldiethylene triamine, or hexamethyltriethylene tetramine.

11. The battery of claim 7, wherein the electrolyte is void of $AlCl_3$.

12. A process for preparing an electroly, the process comprising:
   contacting Mg(hexamethyldisilazane)$_2$ and $MgCl_2$ in a solvent;

wherein:
the electrolyte comprises Mg$_p$(hexamethyldisilazane)$_n$Cl$_q$ wherein p is 3, 5, 7, or 9; n is 2, 4, 6, or 8; and q is 2, 4, 6, or 8; and
the electrolyte is free of aluminum.

13. The process of claim 12, wherein the solvent comprises tetrahydrofuran, glyme, diglyme, triglyme, tetraglyme, a crown ether, dimethoxyethane, 1,3-dioxane, 1,4-dioxane, acetonitrile, sulfolane, hexane, heptane, octane, nonane, decane, benzene, toluene, propylene carbonate, ethylene carbonate, dimethyl carbonate, diethyl carbonate, tetramethylene sulfone, pentamethyldiethylene triamine, or hexamethyltriethylene tetramine.

14. An electrolyte comprising Mg(2,6-di-t-butylphenoxide)$_2$ and MgCl$_2$.

* * * * *